B. F. STEPHENS.
Hand-Vise.

No. 205,434. Patented June 25, 1878.

Witnesses
Chas H Smith
Jno. D. Patten

Inventor
B. F. Stephens
per Lemuel W. Serrell
Atty

UNITED STATES PATENT OFFICE.

BENJAMIN F. STEPHENS, OF BROOKLYN, NEW YORK.

IMPROVEMENT IN HAND-VISES.

Specification forming part of Letters Patent No. 205,434, dated June 25, 1878; application filed May 24, 1878.

*To all whom it may concern:*

Be it known that I, BENJAMIN F. STEPHENS, of Brooklyn, in the county of Kings and State of New York, have invented an Improvement in Hand-Vises, of which the following is a specification:

In this vise the front jaw has a tubular stock at right angles to the face of the jaw, in which stock a bar upon the back jaw slides and is guided by a slot and pin. The screw that actuates the jaws is applied in this stock. Around the stock is a clamping-eye, through which a screw passes to act against a follower in the eye and clamp the stock at any position to which it may be turned within the clamping-eye. The clamping-screw is either at the end of a handle by which the vise is held, or it may be upon a clamping stand or bed upon a bench, or it may be the mandrel of a turning-lathe. In either instance the vise can be made to hold any article that is to be filed, turned, bored, or otherwise worked, or the jaws may be used to hold any cutting or boring tool or bits, so that this tool is of general utility, especially upon small or hand work.

Figure 1:
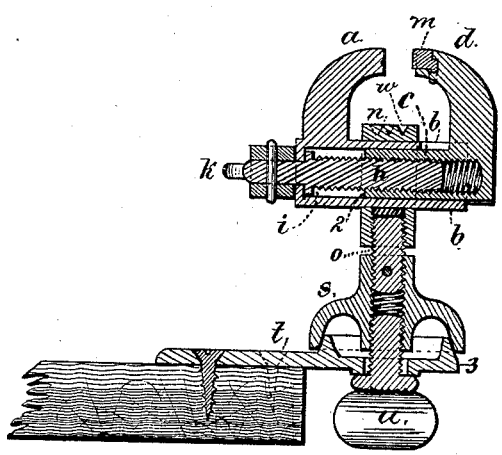
Figure 2:
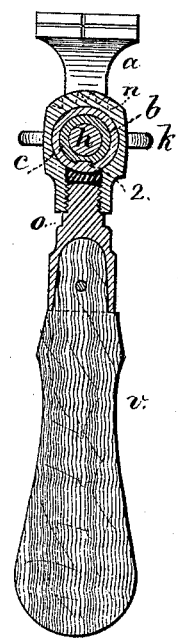
Figure 3:
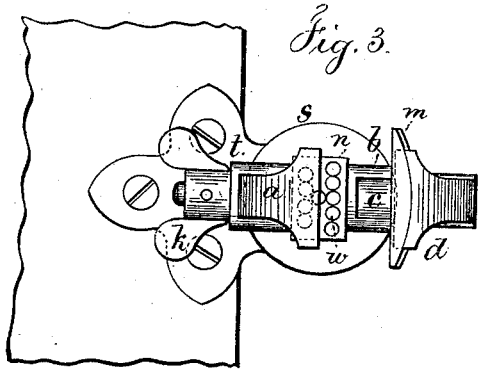

In the drawing, Figure 1 is a vertical section of the vise upon a clamping-stand. Fig. 2 is a section at right angles to Fig. 1, with a handle to the clamping-screw; and Fig. 3 is a plan with the jaws open.

The front jaw *a* is provided with a tubular stock, *b*, at right angles to the face of the jaw, and within this is the bar *c*, that is at right angles to the face of the back jaw *d*, and the bar *c* slides back and forth in the tubular stock *b* as the jaws are opened or closed. The jaws are guided in the tubular stock preferably by a slot in the bar *c* and a key or pin 2 projecting within the stock *b*. The upper part of the stock *b* is slotted for the purpose of admitting the vertical part that connects the back jaw *d* to the bar *c*. By this construction the jaws can be opened or closed by the action of a screw, and they will be guided so as to move parallel, and be supported in such a manner by the bar *c* within the tubular stock that the necessary force can be applied to the jaws without the parts binding or being liable to break, because the bearings of the stock and bar are long in proportion to the movement in opening and closing the jaws.

Any suitable screw can be made use of in the tubular stock to actuate the jaws. I prefer the screw *h*, made with a collar, *i*, within the tubular stock, and a thumb-nut head or wings, *k*, outside the front end of the tubular socket, the same being secured by a cross-pin.

The jaws of this vise may be plain or roughened or protected by wooden or sheet metal faces. I have represented the jaws *d* as made with an undercut groove in the arc of a circle, to receive the segment *m* that accommodates a tapering article.

The jaw-piece or segment may be notched, so as to hold different tools or drills or rods. This jaw-piece is similar to that shown in the Patent No. 105,507, granted July 19, 1870, to A. P. Stephens.

Around the tubular stock *b* is a clamping-eye, *n*, within which the tubular stock can be turned around or moved endwise until either jaw comes in contact with the inner part of one jaw or the other.

The screw *o* passes in at the lower part of the clamping-eye *n*, and, acting against the follower-piece, clamps the tubular stock in any position. This screw *o* may be at the end of and firmly secured to a wooden handle, *v*, as in Fig. 2, so that the vise may be held in the hand, or this screw *o* may be upon and rigidly connected to a clamping-stand, *s*, that rests upon a base-piece, *t*, fastened to a bench and provided with a clamping-screw, *u*, so that the vise may be held firmly upon a bench or table, and the stand *s* can be moved around so that the vise will stand in any desired position to the person using the same; and by loosening the screw *o* the vise can be brought into a vertical or an inclined position, the stock *b* being turned more or less in the clamping-eye *n*.

When the handle *v* is used the vise may be placed at right angles to it and used as a wrench. When the screw *o* is in a lathe the vise may be employed to hold any article that is to be turned or bored, or it may hold turning or boring tools. The cavities or countersinks at *w* in the surface of the clamping-eye *n* can receive the inner end of a boring bit or tool, the body being held by the jaws of the vise, and the tool can then be in line with the axis of motion or at an angle thereto, and hence will act to perforate or to bore or turn the interior of a cylinder or other article of greater or less diameter, according to the angle of the tool and its length.

There may be marks upon the tubular stock and upon the clamping-eye by which to indicate the angle of the one to the other.

I am aware that bench vises have been made with tubular guides containing the operating-screw; but these have required a base to connect one jaw to the other, or else a clamp to hold one of the jaws independent of the tubular connection. In my vise the tubular stock on one jaw is the only connecting and sustaining device for the rod upon the other jaw, the feather serving to guide the movement of the jaws in opening and closing.

I claim as my invention—

1. The tubular stock $b$ upon the jaw $a$ and the bar $c$, upon the jaw $d$, sliding within the stock $b$ and guided by the feather, in combination with the clamping-screw $h$ passing into a nut formed in the rod $c$, substantially as set forth.

2. The combination, with the vise-jaws $a$ $d$ and stock $b$, of the eye $n$ surrounding the stock $b$ and the clamping-screw for securing the eye $n$ in position upon the stock $b$, substantially as set forth.

3. The combination, with the vise and its cylindrical stock $b$, of the eye $n$, screw $o$, clamping-stand $s$, base $t$, and screw $u$, substantially as set forth.

4. The clamping-stand $s$, provided with a base, $t$, and clamping-nut $u$, in combination with the eye $n$, screw $o$, and vise, substantially as set forth.

Signed by me this 20th day of May, A. D. 1878.

BENJ. F. STEPHENS.

Witnesses:
GEO. T. PINCKNEY,
CHAS. H. SMITH.